Sept. 28, 1948.  F. P. ALLEN  2,450,177
BEVERAGE DEVICE

Filed May 29, 1944  3 Sheets-Sheet 1

INVENTOR.
F. P. ALLEN.
BY Lester B. Clark.
ATTORNEY

Sept. 28, 1948.                F. P. ALLEN                2,450,177
                              BEVERAGE DEVICE Filed May 29, 1944                                    3 Sheets-Sheet 3

INVENTOR.
F. P. ALLEN.
BY
Lester B. Clark
ATTORNEY

Patented Sept. 28, 1948

2,450,177

UNITED STATES PATENT OFFICE 2,450,177

BEVERAGE DEVICE

Francis Parker Allen, Beaumont, Tex.

Application May 29, 1944, Serial No. 537,815

4 Claims. (Cl. 99—282)

This invention relates to a material treating device for subjecting a material to immersion in a liquid for a predetermined time whereby the material, the liquid, or both, are modified in a desired manner.

The invention is of particular utility in the brewing of beverages, such as tea or coffee, and is described herein in such environment in its preferred embodiment, although it is to be understood that the device of the invention is not confined to such use but rather comprehends any utilitarian practice in which a material is subjected to immersion for a predetermined period of time.

The primary object of the invention is to provide a device of the class described that is simple, is inexpensive to produce and to operate and is easy to maintain in an efficient operating condition.

Another object is to provide a device that is automatic in operation, yet is free from mechanisms that may fail under operating conditions.

Still another object is to provide a device, including relatively telescopic containers of which the outermost is imperforate and adapted to contain the quantity of liquid to enter into the brewing process.

It is also an object to provide means for access of the liquid to the interior of the inner of two containers as such container moves downwardly into the liquid in the outer container, such access being at a predetermined rate which determines the period of immersion of material positioned within the inner container.

Another object is to provide a floatable member adapted to be positioned within the inner container, to carry the material to be subected to immersion and to rotate about an axis and lift the material from within the submerging medium after a predetermined period of immersion of such material.

Referring more specifically to the device of the invention as utilized in the production of a beverage such as coffee or tea, it is still another object to provide a novel method of producing such beverage.

Another object is to produce a beverage by subjecting the beverage producing material to an upward and circulating movement of liquid upon completion of the brewing process.

A still further object is to remove the beverage producing material from the liquid after such material has been subjected to the action of such liquid for a predetermined period of time.

The foregoing objects, together with other general and specific objects, will be more fully apparent from the following description considered in connection with the accompanying drawings in which.

Figure 1:
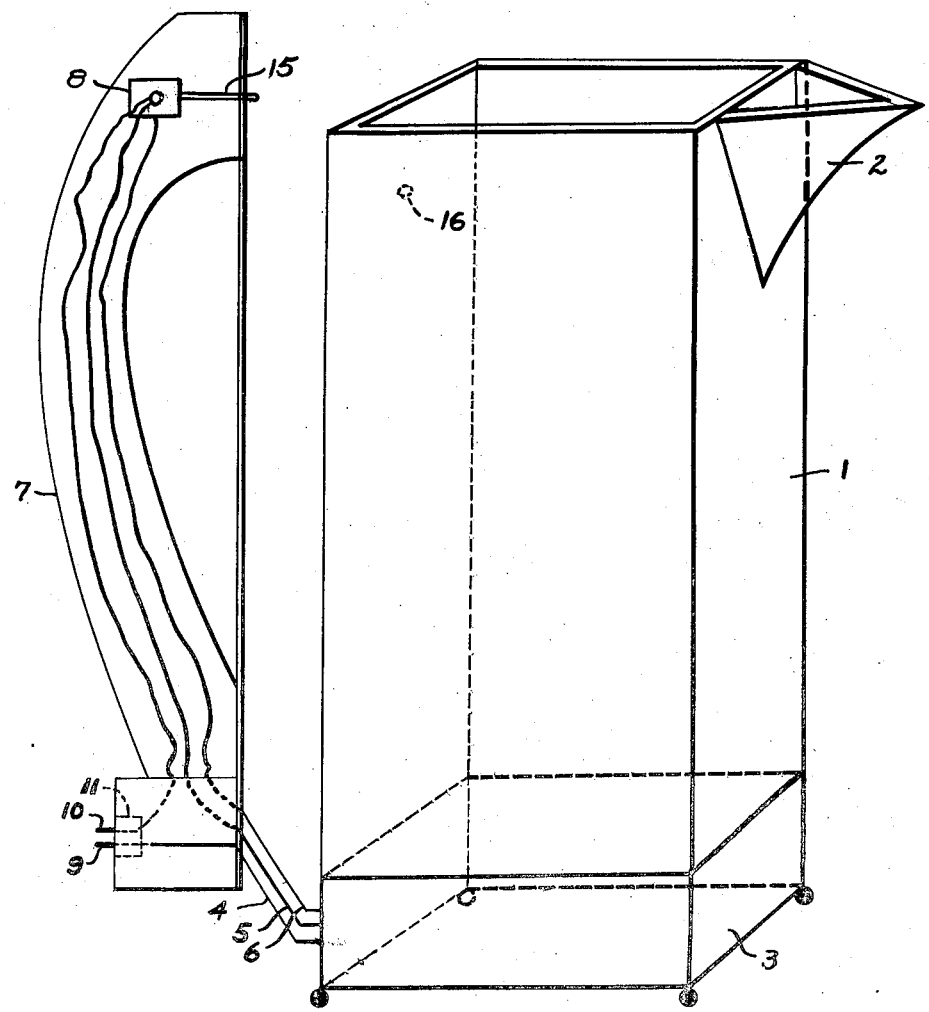
Fig. 1 is a perspective view of the outer or imperforate container which is provided with a handle, the handle being shown displaced sidewardly from its attached position in order to more clearly illustrate the embodiment of the invention.

In the drawings the numeral 1 designates an imperforate container provided with a spout 2 from which liquid may be poured. To provide for heating a liquid within said container, an immersion or radiant type of heater (not shown) is provided at the lower end of the container, as in the base portion 3 thereof. This heater element is supplied with electrical energy through conductors 4, 5 and 6 which enter the handle 7 and which are interconnected through switch 8 to a source of current supplied through contact prongs 9 and 10 of plug 11.

The switch 8 is of the plunger actuated type and includes the plunger 15 which enters the opening 16 in the wall of the container 1 when the handle 7 is in normal attached position. It is to be understood that the switch 8, the interconnecting wires, and the plug 10 are suitably encased within the handle 7 in a manner well known in the art.

Figure 5:
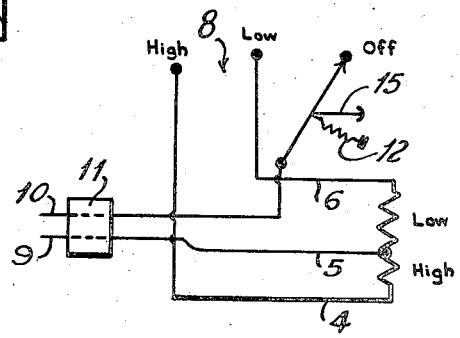
Fig. 5 is a schematic wiring diagram of the electric circuit of the device of the invention.

As illustrated diagrammatically in Fig. 5, the switch 8 is normally in "off" position as under the influence of a spring 12. It seems apparent however that when the plunger 15 is moved to the extreme left and thereafter moves to the right, by steps, under the influence of spring 12, the "high" and "low" heating coils are energized successively. The utility of this sequence of operation will be more fully apparent by description of the mode of operation of the invention hereinafter more fully described.

Figure 2:
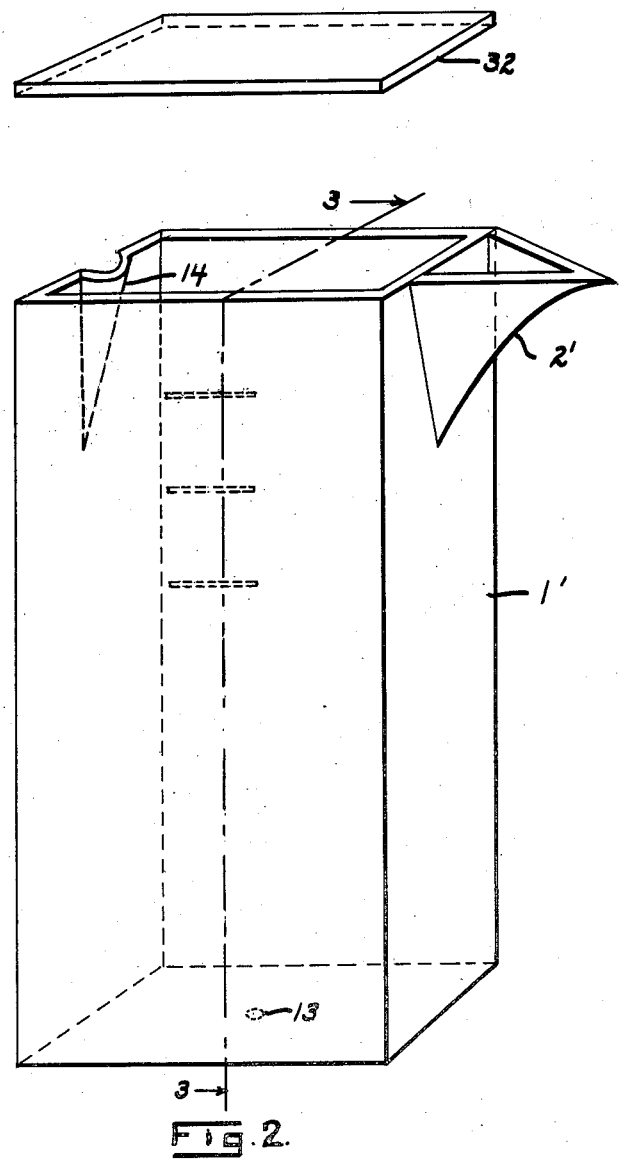
Fig. 2 is a perspective view of the inner or perforate container which is movable telescopically within the imperforate container shown in Fig. 1.

In Fig. 2 there is shown a second container 1', which may be termed the brewing container, having a spout 2' which are respectively of the same configuration as the container 1 and the spout 2 shown in Fig. 1. An opening 13 is provided in the container 1' and such opening is preferably, though not necessarily, provided in the bottom of the container as shown.

The upper portion of the container wall opposite the spout 2' is provided with an inwardly extending groove 14 which decreases in depth downwardly and which serves a purpose that will presently appear.

Figure 3:
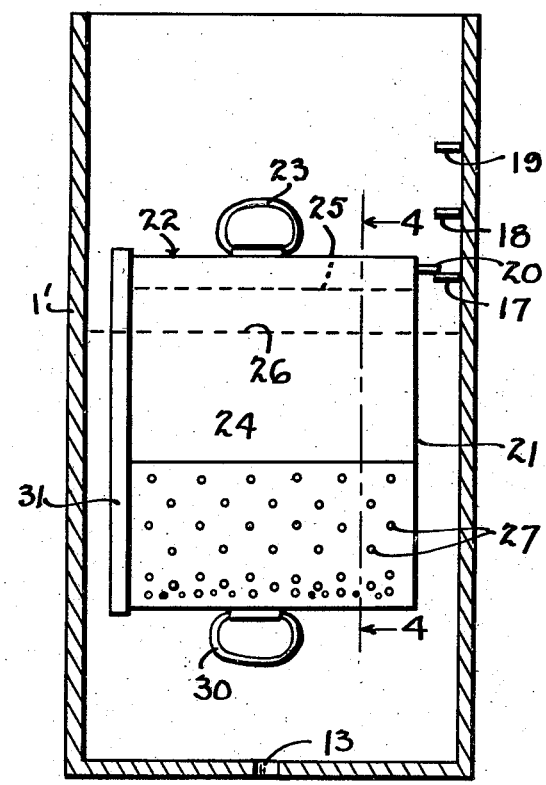
Fig. 3 is a view taken on line 3—3 in Fig. 2 and showing the floatable member positioned within the perforate container and immersing the material.
Figure 4:
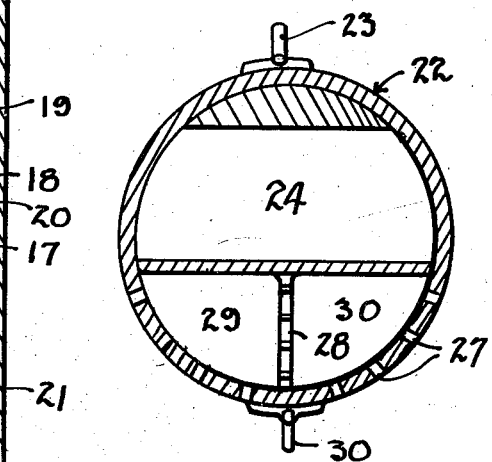
Fig. 4 is a sectional view through the floatable member, the view being taken on line 4—4 in Fig. 3.

On the inner wall of the container 1' is provided a plurality of vertically spaced ledges or supports 17, 18 and 19, any one of which is engageable by a projection 20 (Fig. 3) extending outwardly from the circular end face 21 of a floatable member 22. This floatable member may be lowered into the container 1' as by the ring or handle 23 thereon.

The member 22 is termed floatable as the upper portion thereof comprises a sealed chamber 24 having at its top a small weight member 25. The chamber 24 is of such size that the member 22 will float when liquid rises thereabout to a predetermined level as, for example, to the elevation indicated by the dotted line 26 of Fig. 3. Preferably pressure in the chamber 24 is somewhat below atmospheric so that such pressure is substantially atmospheric pressure at the operating temperatures to which this member is subjected when in use. This feature minimizes the tendency of the walls of the chamber to bulge outwardly when in normal use.

The walls of the member 22 below the chamber 24 are perforated at 27 and a transverse wall 28 is provided to form chambers 29 and 30 in this portion of the member. One end of these chambers is closed by the end face 21 while the other end is closable by the circular cover 31 which fits slidably upon the end of the member 22. Chambers 29 and 30 are thus adapted to receive coffee, tea or other material to be immersed within a liquid for a predetermined period of time and cover or closure member 31 permits ready access to these chambers to admit such material or to remove same therefrom. It seems apparent that, if desired, the end face 21 and/or the cover member 31 may be provided with openings such as those shown at 27 to enhance movement of liquid to and from the chambers 29 and 30.

In the operation of the embodiment of the invention as above described, a desired quantity of liquid is first placed in the container 1. Likewise, a quantity of coffee, tea or other material to be treated is placed in chambers 29 and 30 of the member 22 and confined therein by the closure or cover member 31. Preferably, though not necessarily, the material is equally divided between the chambers 29 and 30.

The floatable member 22 is then lowered into the container 1' by means of the handle 23 until the projection 20 engages the desired support 17, 18 or 19 whereby such member is supported at a desired elevation within the container 1'. The cover 32 (Fig. 2) is then placed upon the container 1'.

The container 1' is next inserted into the top of container 1, the plunger 15 being pushed to the left whereby the "high" heating coil is energized and heating of the liquid in the container 1 is begun. The container 1' is permitted to rest upon the liquid whereupon flow of the liquid through the opening 13 is initiated. This flow continues as the container 1' sinks in the liquid due to the force of gravity. At the same time the temperature of the body of liquid rises until a desirable range of temperatures is reached as the liquid enters the chambers 29 and 30 and treatment of the material therein is begun. Such treatment continues as the liquid level rises about the floatable member 22.

When the liquid level rises to the level indicated by the line 26, the member 22 is buoyed upwardly and the projection 20 is lifted from engagement with its support. Due to the weight 25 the center of gravity of the buoyant member 22 is above the liquid level 26 and hence the member is extremely unstable when buoyed up by the liquid. As a result of this instability the weight 25 causes the member to quickly rotate to a position in which the chambers 29 and 30 are uppermost. The member 22 is so proportioned that the chambers 29 and 30 are thus rotated out of the liquid and above the surface of the liquid. Hence the material within such chambers is removed from immersion and the treatment of such material is terminated. This is of advantage because the material is not permitted to brew or steep for too long a period but is automatically removed after a predetermined period.

As the container 1' approaches its lowermost position and after the floatable member 22 rotates to lift the chambers 29 and 30 from within the body of liquid, the end of the plunger 15 which has been pressing against the outer wall of the container 1' enters the groove 14 in the wall thereof. The resulting movement of the plunger deenergizes the "high" heating coil and energizes the "low" heating coil. Inasmuch as the brewing or treatment operation is complete at this time, it is necessary only that enough heat be supplied to maintain the beverage, or other contents of the device, at a desired temperature. This is accomplished through the energization of the "low" heating coil in the manner just described.

The member 22 may be removed from within the container 1' whenever desired, either before or after the liquid is withdrawn from the device. This member being inverted relative to the position shown in Fig. 3 removal is effected by grasping the handle or ring 30 which is attached to the member at a point substantially opposite the handle or ring 23.

From the foregoing description it is apparent that the invention comprehends a device which is fully automatic and which avoids mechanisms that are apt to get out of order. Desired and accurate correlation of the rate of heating, the rate of rise of liquid within the container 1' and the position of the floatable member within the container may readily be attained. Any desired number of supports, shown as 17, 18, and 19, may be used and such supports will be suitably spaced to provide for predetermined quantities of liquid to be used, it being contemplated that in any event desired uniformity in treatment will be effected. If, for example, coffee or tea is being prepared, the spacing of the supports may be for 1-cup or 2-cup increments.

While the invention has been described as in use with an electric or other self-contained heating unit, it seems obvious that the container having the liquid therein may be placed over a suitable source of heat such as a gas or other fuel burner or stove and the brewing or treating accomplished. One of the principal features of advantage is the automatic removal of the material from the liquid after a predetermined interval so as to prevent overbrewing or treating and to obtain the maximum of advantageous results.

While it seems apparent, attention is directed to the fact that, during the treatment process, liquid rises about the material within the chambers 29 and 30. Furthermore, the liquid entering the opening 13 tends to produce some agitation within the rising liquid to supplement convection agitation thereof. Each of these inherent actions enhances intimate contact of the liquid with each particle of material within the chambers 29 and 30 and, at the same time, impaction of the material is avoided. Hence, efficient and uniform treatment without overtreatment is effected and the objects of the invention are accomplished.

The invention claimed is:

1. A device of the class described comprising an imperforate container to receive a liquid, a multiple range heating unit in the lower portion of said container, switch means for said unit including an actuating member proximate the side wall of said container, a perforate container adapted to enter said imperforate container and engage said actuating member and energize the unit at a high heat rate as said last mentioned container moves telescopically under gravity within the imperforate container, and means in the perforate container for containing a material to be treated by immersion as heated liquid rises therein, said perforate container including means for operating said switch to energize the heating unit at a lower rate as the container approaches its lowermost position of travel.

2. A device of the class described comprising a first container and a second container telescopically movable therein, there being at least one opening in said second container to admit liquid thereto from within the first container, a floatable member having a perforate chamber for material to be immersed, said member being constructed and arranged to be unstable when floated with the perforate chamber lowermost, and means for supporting said floatable member at a selected level within said second container.

3. A device of the class described comprising a container adapted to receive liquid at a predetermined rate and means for supporting a quantity of material to be immersed within the liquid entering said container, said means comprising a floatable member having a foraminated chamber therein for material, the center of gravity of said member being displaced to one side of said chamber so that when buoyantly lifted with the chamber lowermost the member is operable to lift the material from within the liquid.

4. In a device of the class described, a floatable member comprising a perforate chamber and a sealed chamber in side by side relation with an imperforate wall therebetween, said perforate chamber being adapted to receive a material to be treated by a liquid entering the perforations therein and said sealed chamber being of a size to support the member in a body of liquid with the perforate chamber above the surface of the liquid, and a weight member secured to the wall of the sealed chamber opposite said imperforate wall rendering said floatable member stable in the body of liquid only when said perforate chamber is uppermost.

FRANCIS PARKER ALLEN.

REFERENCES CITED

The following references are of record in the file of this patent:

UNITED STATES PATENTS

| Number | Name | Date |
|---|---|---|
| 1,029,939 | McLean | June 18, 1912 |
| 1,177,082 | Antisell | Mar. 28, 1916 |
| 1,362,644 | Sprague | Dec. 21, 1920 |
| 1,956,067 | Hertz | Apr. 24, 1934 |
| 2,065,149 | Newman | Dec. 22, 1936 |
| 2,079,603 | Davis | May 11, 1937 |
| 2,209,831 | Schurig | July 30, 1940 |
| 2,343,108 | Appleman | Feb. 22, 1944 |

FOREIGN PATENTS

| Number | Country | Date |
|---|---|---|
| 381,950 | Germany | Sept. 27, 1923 |